(12) United States Patent
Nies et al.

(10) Patent No.: US 9,022,300 B2
(45) Date of Patent: May 5, 2015

(54) VERTICAL RISING SPRINKLER APPARATUS WITH STABILIZED BASE UNIT

(75) Inventors: Juergen Nies, Winchester, VA (US); Ha Van Duong, Winchester, VA (US); Vicky Ann Michael, Winchester, VA (US)

(73) Assignee: Melnor, Inc., Winchester, VA (US)

( * ) Notice: Subject to any disclaimer, the term of this patent is extended or adjusted under 35 U.S.C. 154(b) by 1206 days.

(21) Appl. No.: 12/181,867

(22) Filed: Jul. 29, 2008

(65) Prior Publication Data

US 2009/0230206 A1   Sep. 17, 2009

Related U.S. Application Data

(60) Provisional application No. 61/036,705, filed on Mar. 14, 2008, provisional application No. 61/040,185, filed on Mar. 28, 2008.

(51) Int. Cl.
*B05B 15/06* (2006.01)
*A01G 25/02* (2006.01)
*B05B 15/10* (2006.01)

(52) U.S. Cl.
CPC ......... *B05B 15/062* (2013.01); *Y10T 29/49826* (2015.01); *B05B 15/06* (2013.01); *B05B 15/061* (2013.01); *A01G 25/02* (2013.01); *B05B 15/064* (2013.01); *B05B 15/068* (2013.01); *B05B 15/10* (2013.01)

(58) Field of Classification Search
CPC .... B05B 15/06; B05B 15/061; B05B 15/062; B05B 15/064
USPC ......... 239/200, 201, 203, 204, 205, 206, 210, 239/251, 264, 265, 273, 275, 276, 279, 280, 239/280.5, 281, 285, 390; 248/85
See application file for complete search history.

(56) References Cited

U.S. PATENT DOCUMENTS

| | | | |
|---|---|---|---|
| 925,680 A | 6/1909 | Burns | |
| 1,743,537 A | 7/1927 | Freese | |
| 1,731,555 A | 12/1927 | Williams | |
| 1,959,886 A | 5/1934 | Wadsworth | |
| 2,077,668 A * | 4/1937 | Bristol | 248/86 |
| 3,289,418 A | 12/1966 | Edgerton | |
| 4,095,744 A * | 6/1978 | Villelli | 239/1 |
| 4,824,020 A * | 4/1989 | Harward | 239/264 |
| 5,158,231 A | 10/1992 | Christen et al. | |
| 5,439,176 A * | 8/1995 | Bussiere | 239/276 |
| D397,203 S | 8/1998 | Wang | |
| D437,389 S | 2/2001 | Hsin-Fa et al. | |

(Continued)

OTHER PUBLICATIONS

European Search Report (dated Jun. 3, 2009) for corresponding European Application No. 08405195.2.

(Continued)

*Primary Examiner* — Ryan Reis
(74) *Attorney, Agent, or Firm* — Westerman, Hattori, Daniels & Adrian, LLP

(57) ABSTRACT

A watering device for watering bushes, grass, etc., which has a base unit connected to a substantially vertical riser which is connected to a sprinkler head, wherein the base unit can also have a receiving unit which holds a substantially vertical riser and a plurality stabilizing units, wherein the plurality of stabilizing units are adapted to be inserted in the ground, and wherein the stabilizing units are removable from the receiving unit.

19 Claims, 8 Drawing Sheets

(56) References Cited

U.S. PATENT DOCUMENTS

| | | | |
|---|---|---|---|
| D438,284 S | 2/2001 | King et al. | |
| D440,280 S | 4/2001 | King et al. | |
| D444,206 S | 6/2001 | King et al. | |
| D445,479 S | 7/2001 | Thomas | |
| 6,409,095 B2 | 6/2002 | King | |
| 6,601,779 B1 * | 8/2003 | Heren et al. | 239/251 |
| 6,604,691 B1 * | 8/2003 | Thomas et al. | 239/276 |
| 6,874,696 B1 * | 4/2005 | Ericksen et al. | 239/1 |
| 7,066,403 B2 | 6/2006 | Heren et al. | |
| 2004/0164179 A1 * | 8/2004 | Corbett | 239/276 |
| 2006/0255177 A1 * | 11/2006 | Heatwole et al. | 239/276 |
| 2010/0006669 A1 * | 1/2010 | Thompson | 239/200 |

OTHER PUBLICATIONS

Gilmour Group; "Extra Large Coverage Sprinkler-Metal"; Gilmour Gardening Solutions Website [http://www.gilmour.com/Watering/Hose-End/Sprinklers/Extra-Large-Coverage/Extra-Large-Coverage-Sprinkler-Metal-40002052.aspx].

Gilmour Group; "Metal Head Impulse"; Gilmour Gardening Solutions Website [http://www.gilmour.com/Watering/Hose-End/Sprinklers/Large-Coverage/Metal-Head-Impulse-.aspx].

Gilmour Group; "Poly Head Impulse"; Gilmour Gardening Solutions Website [http://www.gilmour.com/Watering/Hose-End/Sprinklers/Large-Coverage/Poly-Head-Impulse-.aspx].

Gilmour Group; "Telescoping Sprinklers"; Gilmour Gardening Solutions Website [http://www.gilmour.com/Watering/Hose-End/Sprinklers/Telescoping-Sprinklers.aspx].

* cited by examiner

VERTICAL RISING SPRINKLER APPARATUS WITH STABILIZED BASE UNIT

BACKGROUND OF INVENTION

The following description sets forth the inventor's knowledge of related art and problems therein and should not be construed as an admission of knowledge in the prior art.

Watering devices which can be positioned several feet above the ground and which incorporate a single base spike structure have been known for some time. However, such devices have a drawback of being unstable when in use. When a sprinkler is attached to a vertical riser, the spray of the sprinkler creates a torque on the vertical riser and the single base spike which is located at the bottom of the watering device and inserted into the ground for stability. Furthermore, if the sprinkler is of an oscillating, rotary or pulsating type, the torque being applied to the base spike changes direction according to the direction the sprinkler is pointed.

As torque is applied to the base spike (caused by the outward flow of water from the sprinkler), the base spike has a tendency to move and create a cavity in the soil. The base spike can then move progressively further within such cavity as the sprinkler continues to operate. This process can continue until the sprinkler and base spike move away from the desired watering axis. The sprinkler and base spike can eventually fall to the ground, as the base spike becomes loose in the soil.

To alleviate this problem, some single spike bases with a vertical riser and sprinkler attached to the top, incorporate sprinklers having two opposing heads. One sprinkler head sprays in one direction while the other sprays in an opposite direction. This helps to eliminate or balance the torque applied to the base. This design also has drawbacks. In particular the sprinkler heads need to spray in opposing directions in order to maintain stability. However, a user may only want to water a narrow area (e.g. a 45 degree area near the sprinkler). This is not possible with the opposing head sprinkler, as one head needs to be approximately 180 degrees from the other head.

A telescoping tripod base, in which a sprinkler sits atop has also been known. See for example U.S. Pat. No. 4,824,020. However, this design suffers from a large footprint due to the telescoping tripod. If a user wanted to place the sprinkler in a narrow space (e.g. in between a row of bushes and a house), the user may not have enough room due to the large area taken up by the telescoping tripod base. Additionally, a telescoping tripod base is difficult to manufacture, expensive to produce and cumbersome to package.

Sprinkler bases having three spikes have also been known. However these sprinklers bases are not used with a vertical riser and therefore suffer from limited sprinkler coverage in a desired area such as shrubs and bushes. Without a vertical rod, the sprinkler cannot reach and spray over shrubs and bushes.

Additionally, the three spiked sprinkler bases known are not stable enough for a sprinkler atop a vertical rod. Some bases suffer from a non-symmetrical spike pattern which can lead to tilting or falling over of the sprinkler. Other bases suffer in that that the spikes used are not of the appropriate length (e.g. too short). This too can cause the sprinkler to fall over.

Yet another drawback of already known three spiked sprinkler bases is that they are heavy, bulky and inconvenient to ship and sell. That is, three spike bases have heretofore been manufactured as a single unit. This base is difficult to package and difficult to ship given the unusual and awkward dimensions of the sprinkler base.

SUMMARY OF THE INVENTION

The present invention is directed toward a watering device comprising a base unit which is connected to a substantially vertical riser which is connected to a sprinkler head. The base unit comprises a receiving unit which holds a substantially vertical riser and a plurality stabilizing units. The plurality of stabilizing units are adapted to be inserted in the ground, and where the stabilizing units are removable from the receiving unit.

The vertical riser may be telescoping and the sprinkler head may be, for example, an oscillating, rotary, or pulsating type sprinkler head. The sprinkler head can also be a pop-up type sprinkler that extends above the vertical riser.

The receiving unit may comprise a hose adaptor portion designed to securely connect to a hose, a water intake portion in communication with an internal passage, the internal passage being in communication with the vertical riser. The stabilizing units may include a male threaded mating portion which is which is in communication with a corresponding female threaded mating portion of the receiving unit. Alternatively, the stabilizing units may include a snap-in mating portion which is received by a snap-in mating portion of said receiving unit.

BRIEF DESCRIPTION OF DRAWINGS

A preferred embodiment of the invention will be described with reference to the accompanying drawings, wherein.

DETAILED DESCRIPTION OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
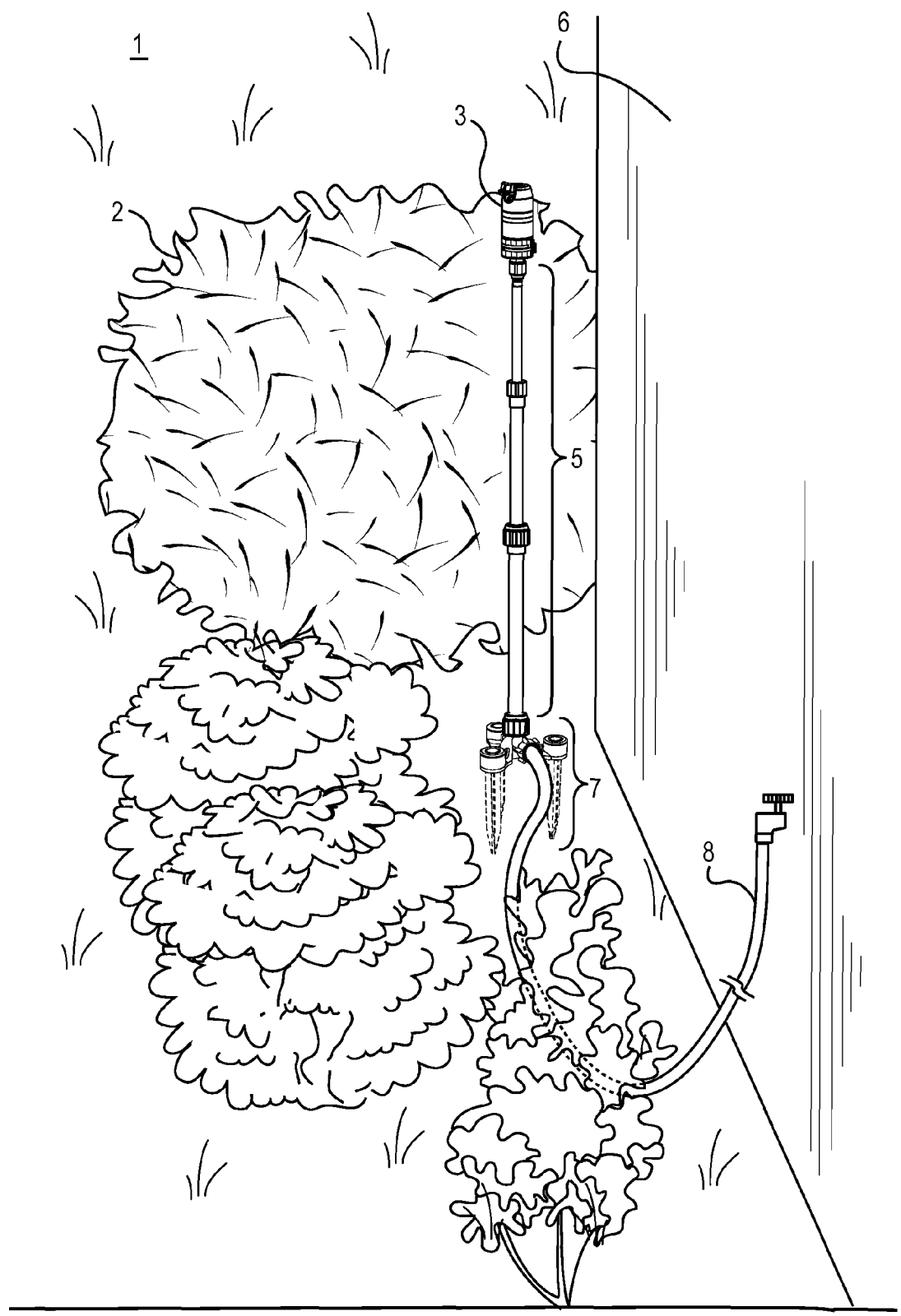
FIG. 1 is a drawing of a watering unit in use in a residential setting.

FIG. 1 shows an example of how watering device 1 is positioned while in use. Watering device 1 comprises sprinkler head 3, riser 5 and base unit 7. Riser 5 can be adjustable from between 12 inches to 80 inches. Preferably riser 5 can be adjusted from 18 inches to 65 inches. More preferably riser 5 can be adjusted from 26 inches to 50 inches. Watering device 1 is shown positioned in between a house 6 and shrubs 2. Because of the small footprint of base unit 7, watering device 1 is able to fit into small and confined spaces. For example, base unit 7 can have a radius of 3 inches. However, base unit 7 may have a radius as narrow as 1 inch or as large as 4 inches or more. A hose 8 is connected to base unit 7 and supplies water to sprinkler head 3. Sprinkler head 3 may be a rotary-type, oscillating type, pulsating-type, or any other suitable type of sprinkler.

Watering device 1 is designed so that it may be hidden from view behind a row of shrubs or other obstructions. Because watering device 1 is concealed, this allows the user to leave watering device 1 in a desired location without having to put it away between uses.

A bottom end of riser 5 may be threadably attached to base unit 7. Sprinkler head 3 may be threadably attached to a top end of riser 5. Riser 5 can be adjusted to a desired height so that sprinkler head 3 reaches the appropriate height. For example, as shown in FIG. 1, riser 5 is a telescoping riser and is shown adjusted so that sprinkler head 3 is positioned above shrub 2. This allows watering device 1 to effectively water an area with obstructions such as shrubs, hedges, or other vegetation.

Figure 2:
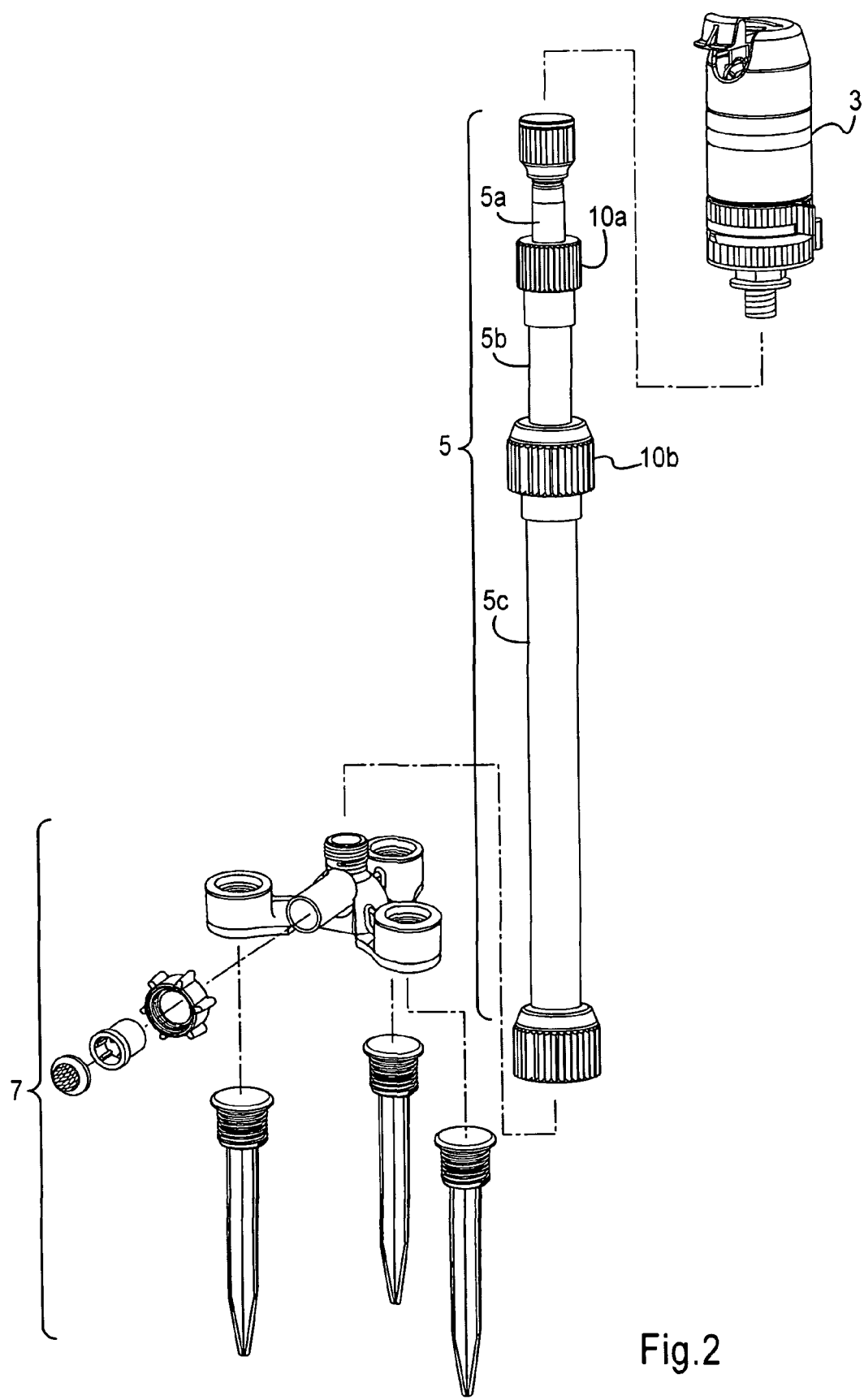
FIG. 2 is an exploded view of the watering unit.

FIG. 2 shows an exploded view of watering device 1. The top portion of riser 5 is connected to sprinkler head 3. The bottom portion of riser 5 is connected to base unit 7. Riser 5 may be telescoping, as shown in FIG. 2, wherein riser 5 includes one or more hollow tubes and so a portion of each tube fits within an adjacent tube. Riser 5 is designed so that water can flow within the tube without leaking to the outside.

To adjust riser 5, one or more adjustment rings 10 can be used. As shown in FIG. 2, two adjustment rings are used, 10a and 10b. Adjustment rings 10a and 10b are used in conjunction with three tube portions 5a, 5b, and 5c. To adjust the height of riser 5, adjustment rings 10a and 10b can be tightened and loosened so that the tube portions may be extended or retracted to the desired height. It is understood that other known designs for a telescoping unit may also be used.

In one embodiment of the invention, a hose 8 is connected to base unit 7. Water can then flow through hose 8 and into base unit 7 where it is guided into riser 5. Riser 5 then guides the water into sprinkler head 3, where it is then sprayed over a desired area.

Figure 3:
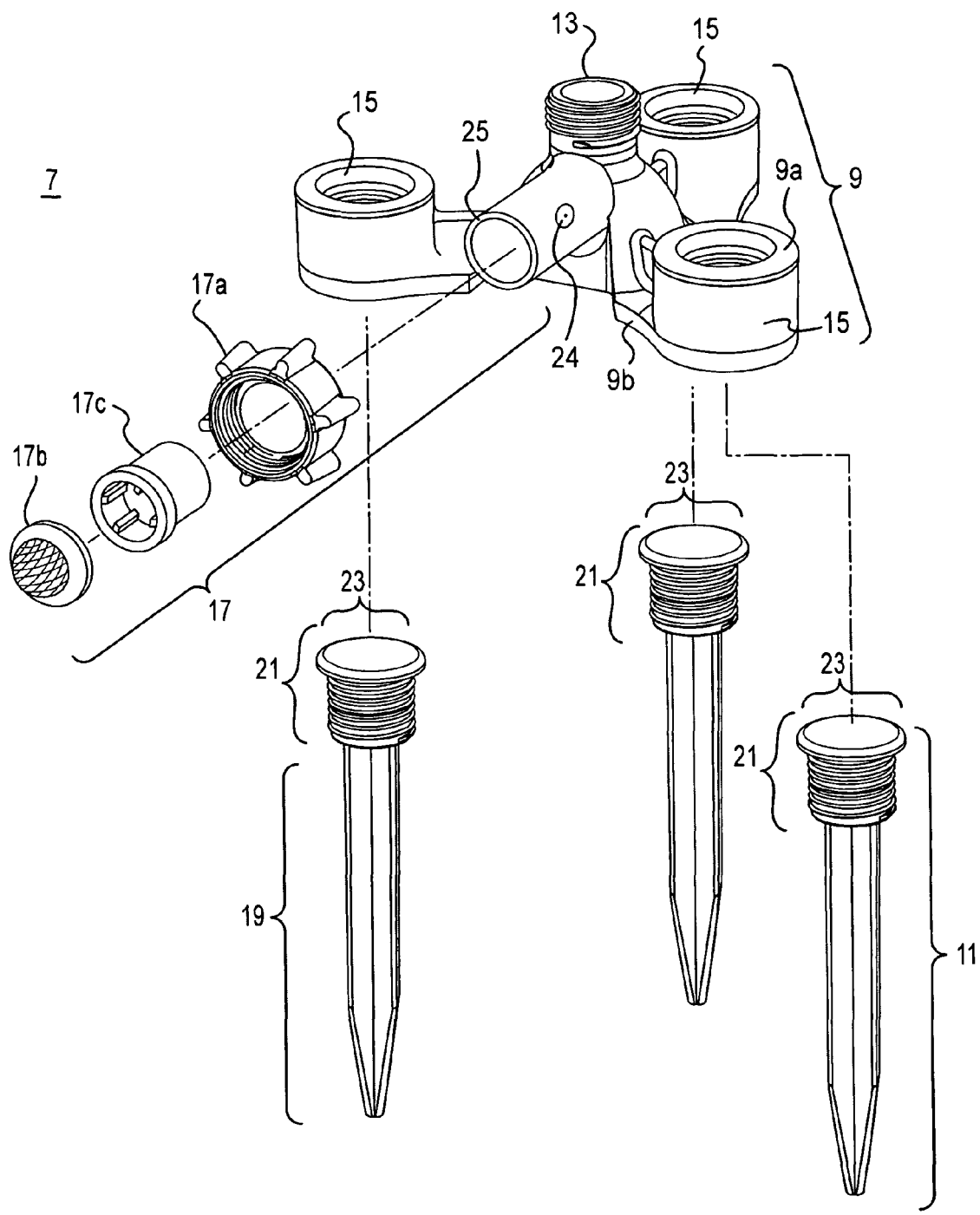
FIG. 3 is an exploded view of a base unit of the watering unit.

FIG. 3 shows an embodiment of base unit 7. Base unit 7 comprises a receiving unit 9 and a plurality of stabilizing units 11 (e.g., spikes, stakes, etc.), which can be removable from receiving unit 9. In this embodiment, receiving unit 9 and stabilizing units 11 are formed of a polymeric material which helps to prevent rust and reduce the cost and weight of base unit 7, however other materials may also be used for one or both of these units.

Receiving unit 9 comprises a top surface 9a, a bottom surface 9b, a riser receiving portion 13, a plurality of stabilizing unit receiving portions 15 extending from the top surface to the bottom surface of riser receiving portion 13, and a hose adaptor portion 17. The stabilizing unit receiving portions are designed to secure each of the stabilizing units 11 into receiving unit 9. Located at the end of the stabilizing unit receiving portions 15 are openings or apertures designed to receive and secure stabilizing units 11.

The hose adaptor portion 17 includes water intake 25, coupling nut 17a, water filter 17b, and grommet 17c. Water intake 25 is connected to first internal passage 24a which is connected to riser receiving portion 13. First internal passage 24a has a first end opened to hose adaptor portion 17 and a second end opened to sprinkler head 3. This configuration allows water from a hose to flow directly into receiving unit 9 and out sprinkler head 3. Riser receiving portion 13 is hollow, allowing water to flow from water intake 25 to first internal passage 24a and then through the vertical internal passage 24b and through the hollow vertical riser 5.

According to one aspect of this embodiment, receiving unit 9 includes three stabilizing unit receiving portions 15, positioned approximately 120 degrees apart. The equally spaced stabilizing unit receiving portions allows for maximum stability of base unit 7. As such, regardless of the direction sprinkler head 3 is spraying, watering device 1 will be stably supported. It is understood that this design is not limited to three stabilizing unit receiving portions.

Stabilizing unit receiving portions 15 are located approximately equal distance from a center point of receiving unit 9. Such a configuration, for example, improves the stability of base unit 7 in watering unit 1. As shown in FIG. 3, riser receiving portion 13 is located at the center point of the receiving unit 9 and extends away from the bottom portion 9b of receiving unit 9.

Each of the stabilizing units 11 comprises a first portion (bottom end) having a spike portion 19 and a second portion (top end) having a threaded mating portion 21. The second portion may also include a head portion 23 that is provided on the top surface of the threaded mating portion 21. Stabilizing units 11 may be configured to be screwed into stabilizing unit receiving portion 15. That is, threaded mating portion 21 has external or male threads while stabilizing unit receiving portion 15 has internal or female threads.

Stabilizing units 11 can also include ring stop 26. Ring stop 26 is provided between mating portion 21 and spike portion 19. Ring stop 26 serves to prevent a stabilizing unit 11 from being screwed too far into stabilizing unit receiving portion 15. Ring stop 26 also serves to prevent debris from the ground from entering stabilizing unit receiving portion 15; e.g. when ring stop 26 is flush with bottom surface 9b of receiving unit 9.

The outside diameter of head portion 23 may be configured to be approximately the same size as the internal diameter of the top portion 9b of the stabilizing unit receiving portion 15. This helps to enhance aesthetics of the base unit 7 as well as protect the integrity of the threads by preventing the ingress of debris. Each of the stabilizing units 11 is configured to be approximately the same length so as to stably support the watering unit. The length of stabilizing units 11 is approximately 3-12 inches. More preferably, the length of stabilizing units 11 are 4-10 inches. Even more preferably, the length of stabilizing units 11 are 5-8 inches.

Stabilizing units 11 are designed to be inserted in the ground and to securely fasten receiving unit 9 to the ground. Having three stabilizing units 11 with spike portions 19, provides for a stable base. A stable base is needed for watering device 1 due to the height of the device. Additionally, with sprinkler head 3 located on top of riser 5, a stable base ensures minimal movement of sprinkler head 3. With riser 5 extending vertically in the air and sprinkler head 3 fixed atop riser 5, a great amount of torque is place on base unit 7. Without a stable and secure base, watering device 1 may tip over due to the constant rotary/pulsating effect of sprinkler head 3.

Furthermore, removable stabilizing units 11 have several advantages to fixed stabilizing unit designs. Such advantages include (but are not limited to) reducing storage space; reducing the shelving space needed to display or store the watering device (both in the store and at the home); and making the product easier to package and ship. This dramatically lowers the manufacturing, shipping and storage costs of watering device 1.

Figure 5:
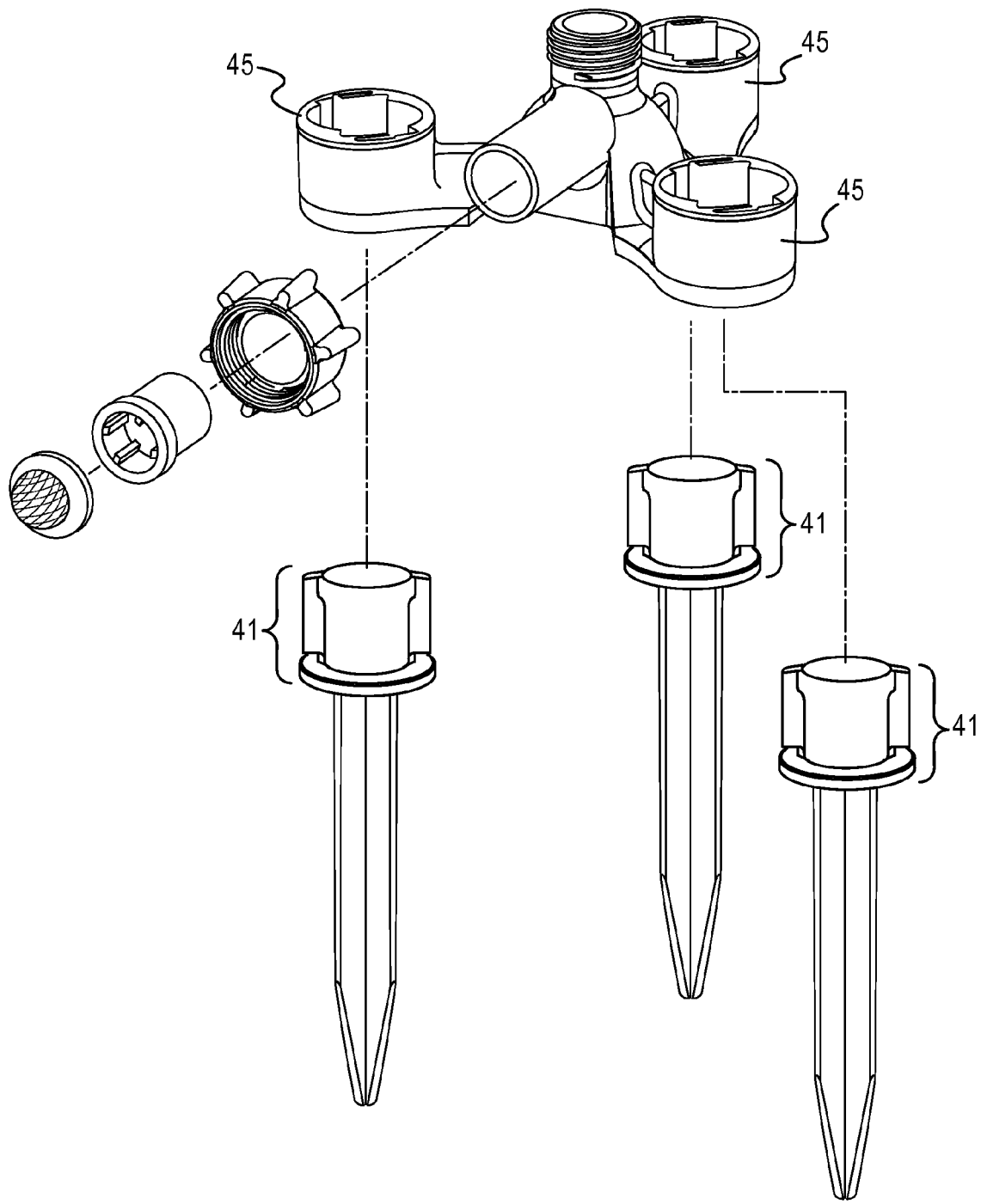
FIG. 5 is an exploded view of another embodiment of a base unit of the watering unit.

In another embodiment of the invention, shown in FIG. 5, stabilizing unit 11 may have a snap-in mating portion 41, which communicates with a snap-in receiving portion 45. It is generally understood that mating portion 41 may be any type suitable to be securely fastened to receiving unit 9 and also be removable. One advantage of this embodiment is the ease in which stabilizing unit 11 may be secured to receiving unit 9. To lock or unlock snap-in mating portion 41 to snap-in receiving portion 45, a user simply has to insert snap-in mating portion 41 into snap-in receiving portion 45 and twist. This locks or unlocks stabilizing unit 11 in place.

Figure 4:
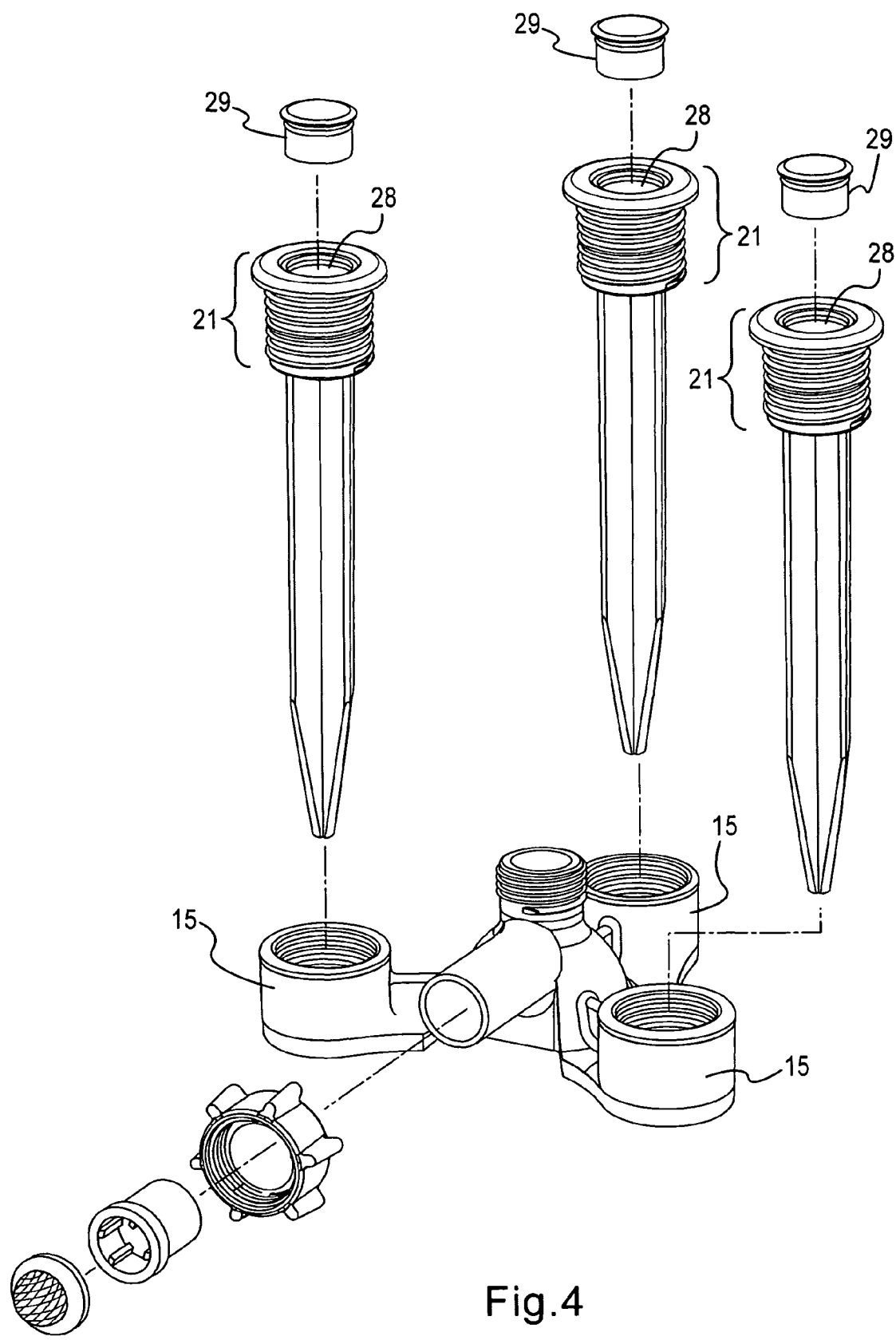
FIG. 4 is an exploded view of another embodiment of a base unit of the watering unit.

According to another aspect of this invention, shown in FIG. 4, the head portion 23 of stabilizing unit 11 may be configured to have a cavity 28 located within it. The head portion 23 could then be fitted with a cap 29 to make sure no unwanted debris gets into cavity 28. Cap 29 may be attach to head portion 23 by snapping-in, screwing-in or any other suitable method. Cavity 28 reduces the weight of the watering device as well as reduces the amount of material needed to make it and also improves manufacturability.

Figure 6A:
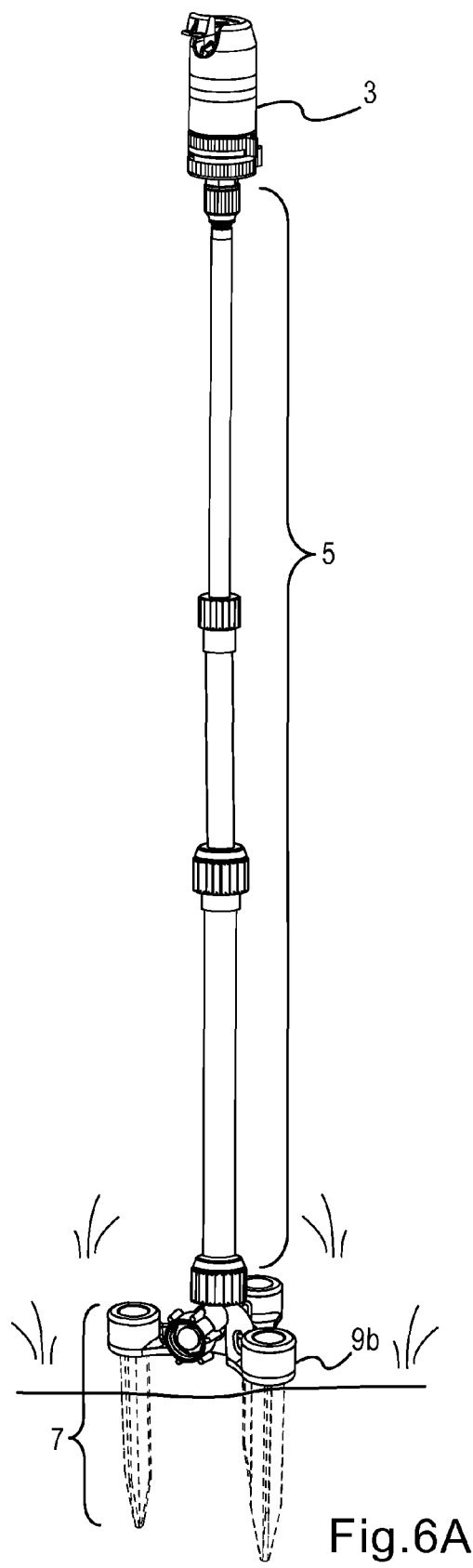
FIG. 6A is a perspective view of the watering unit when the watering unit is extended.
Figure 6B:
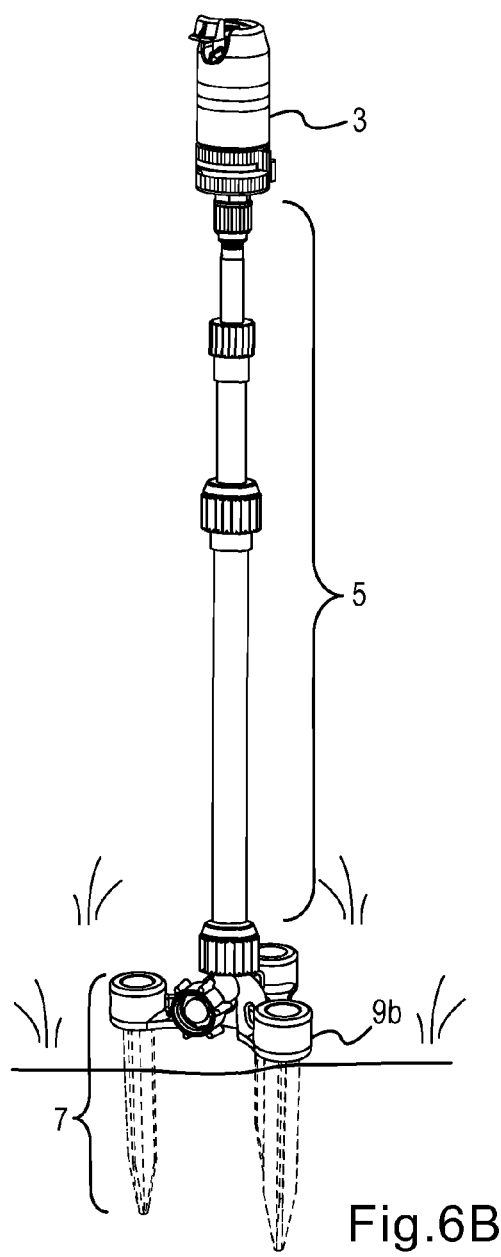
FIG. 6B is a perspective view of the watering unit when the watering unit is retracted.

FIGS. 6A and 6B show an example of watering unit 1 in an extended and retracted position, respectively. In operation for example, bottom surface 9b of the main unit 9 is placed level with the ground, with each of the stabilizing units 11 individually inserted in the downward direction and in communication with the respective stabilizing unit receiving portions 15. The spike portion 19 is inserted into the soil while the threaded mating portion 21 is configured to communicate with the stabilizing unit receiving portions 15.

Once base unit 7 is placed in the desired position, sprinkler head 3 can be aimed and adjusted to produce the desired sprinkling pattern over the area to be watered. A hose is then attached to hose adaptor portion 17. Water can then flow through the hose and into receiving unit 9 via the hose adaptor portion 17 and water intake 25. Once inside receiving unit 9, the water is directed up and into riser 5. Water then travels through riser 5 and into sprinkler head 3.

Figure 7A:
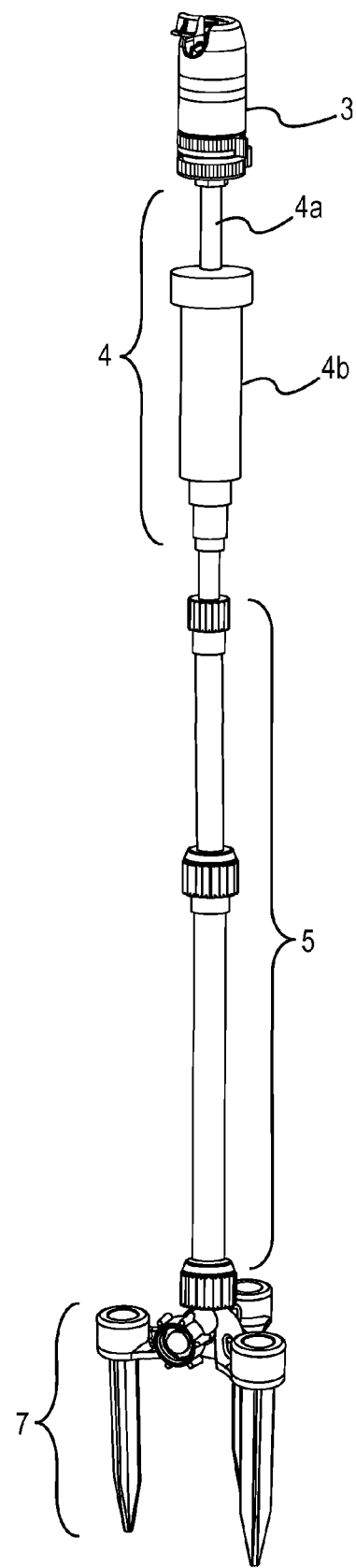
FIG. 7A is a perspective view of another embodiment of the watering unit.

As shown in FIG. 7A, according to another aspect of the present invention, sprinkler head 3 can be attached to a pop-up device 4 that is configured to vertically rise (e.g., in a direction away from the top of the telescoping unit 5) in response to water pressure in riser 5. Pop-up device 4 is comprised of vertical pop-up tube 4a and housing 4b. Pop-up tube 4a is attached to sprinkler head 3 and housing 4b is attached to vertical riser 5. Sprinkler head 3, as shown in FIG. 7A is a rotary sprinkler. However, any other type of suitable sprinkler head, such as pop-up sprinkler head 3a or pulsating sprinkler 3b, can also be used.

Figure 7B:
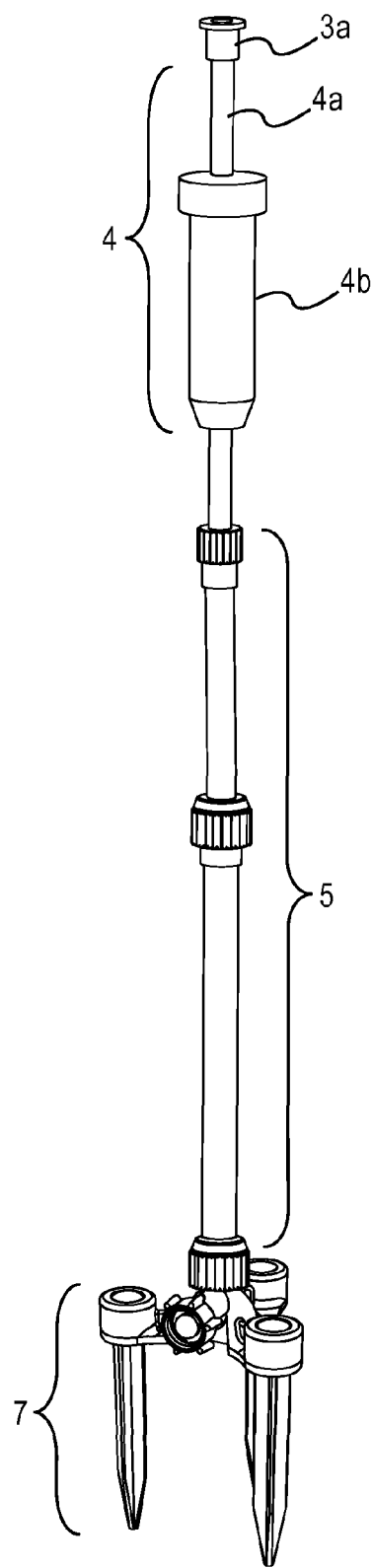
FIG. 7B is a perspective view of another embodiment of the watering unit.

As shown in FIG. 7B, pop-up sprinkler head 3a is attached to pop-up tube 4a. Having a sprinkler head with a reduced diameter, such as pop-up sprinkler head 3a, allows the sprinkler head to fit within pop-up housing 4b when watering device 1 is not in operation. This helps watering device 1 to remain concealed when not in use.

Figure 7C:
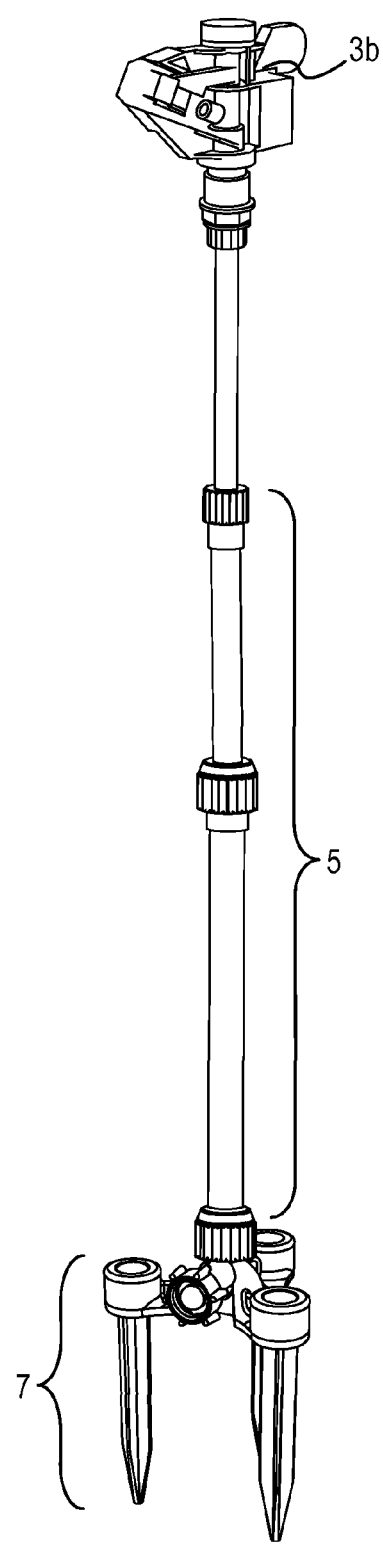
FIG. 7C is a perspective view of another embodiment of the watering unit.

As shown in FIG. 7C, watering device 1 may also use a pulsating type sprinkler 3b to water a desired area. A pulsating type sprinkler head has a wide coverage area and can deliver a large amount of water in a short period of time.

One advantage to using a pop-up device 4 is that it enables the sprinkler head (e.g., 3, 3a, or 3b) to be more easily hidden during an inoperative condition. Another advantage is that a larger spray pattern may be achieved by elevating the sprinkler head during an operative condition.

Watering device 1 is also easy to use and assemble. A user attaches removable stabilizing units 11 to receiving unit 9, attaches riser 5 to receiving unit 9 and attaches sprinkler head 3 or 3a or 3b to riser 5. A user then positions watering device 1 in a desired location, for example, by inserting spikes 19 in the soil and pressing the spikes 19 down by applying downward pressure against the receiving unit 9 with his/her foot if necessary.

The user then adjusts riser 5 to the appropriate height. For example, this height could be just higher than the shrubs behind which the device may be located. A hose is attached to base unit 7 via hose adaptor portion 17. Watering device 1 is then ready to use.

Furthermore, watering device 1 may be used in conjunction with any number of water conservation devices such as the devices explained in U.S. application Ser. Nos. 12/046,923 and 12/046,944.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. For example, the above described watering device may configured to use any combination of the above described base units, vertical risers, pop-up units and sprinkler heads.

We claim:

1. A watering device comprising:
   a base unit;
   a substantially vertical telescoping riser; and
   a sprinkler head; wherein
   a bottom part of said substantially vertical riser is in communication with said base unit and a top part of said substantially vertical riser is in communication with said sprinkler head,
   said base unit comprising:
   a receiving unit; and
   a plurality of rigid stabilizing units; wherein
   said plurality of rigid stabilizing units are directly connected to said receiving unit,
   said plurality of rigid stabilizing units is adapted to be inserted nearly their entire length into the ground,
   said plurality of rigid stabilizing units is removable from said receiving unit, and
   wherein the substantially vertical telescoping riser and sprinkler head do not extend outside of a circumference of the base unit.

2. The watering device according to claim 1, wherein a height of said vertical riser is adjustable.

3. The watering device according to claim 1, wherein said sprinkler head is a pulsating sprinkler.

4. The watering device according to claim 1, wherein said sprinkler head is a rotary sprinkler.

5. The watering device according to claim 1, wherein each of said rigid stabilizing units a mechanism to be attached to the mating portion of said receiving unit.

6. The watering device according to claim 1, wherein said sprinkler head is in communication with a pop-up extension unit.

7. The watering device according to claim 1, wherein said plurality of rigid stabilizing units long enough to secure the device into the ground.

8. The watering device according to claim 1, wherein said base unit and said vertical riser are made of polymeric material.

9. The watering device according to claim 1, wherein said receiving unit has a radius of between 1 inch and 4 inches.

10. A watering device comprising:
    a base unit;
    a substantially vertical telescoping riser; and
    a rotary sprinkler head; wherein a bottom part of said substantially vertical riser is threadably connected with said base unit and a top part of said substantially vertical riser is threadably connected with said sprinkler head,
said base unit comprises:
a receiving unit;
said receiving unit holds a plurality of stabilizing units; wherein
said plurality of stabilizing units is adapted to be inserted nearly their entire length into the ground, and said plurality of stabilizing units is removable from said receiving unit;
said stabilizing units are between 5 inches and 8 inches long;
said receiving unit has a radius of approximately 3 inches, and
wherein the substantially vertical telescoping riser and sprinkler head do not extend outside of a circumference of the base unit.

11. A method of assembling a watering device including a sprinkler head, a substantially vertical telescoping riser and a base unit, said method comprising: attaching stabilizing units, adapted to be inserted nearly their entire length into the soil, to a receiving portion of said base unit, wherein said base unit comprises said receiving portion and said stabilizing units, and wherein the substantially vertical telescoping riser and sprinkler head do not extend outside of a circumference of the base unit.

12. The method of assembling a watering device according to claim 11, further comprising:
attaching said substantially vertical telescoping riser to said base unit.

13. The method of assembling a watering device according to claim 12, further comprising:
attaching a pop-up unit to said substantially vertical telescoping riser.

14. The method of assembling a watering device according claim 11 further comprising:
attaching a hose to said base unit;
inserting said base unit into the soil; and
adjusting said substantially vertical telescoping riser to a desired height.

15. The watering device according to claim 1, wherein said sprinkler is a pulsating or rotary sprinkler.

16. The method of assembling a watering device according to claim 11, wherein said sprinkler is a pulsating or rotary sprinkler.

17. The watering device according to claim 1, wherein said plurality of rigid stabilizing units are parallel with said vertical riser when said watering device is in use.

18. The watering device according to claim 1, wherein there are exactly three rigid stabilizing units.

19. The watering device according to claim 1, wherein said plurality of rigid stabilizing units are entirely located underneath a footprint of said base unit when said watering device is in use.

* * * * *